*INVENTOR.*
NATHAN M. HAYNES
BY
S. Stephen Baker
ATTORNEY

Feb. 10, 1953 N. M. HAYNES 2,628,287

MAGNETIC RECORDING APPARATUS

Filed Feb. 16, 1951 2 SHEETS—SHEET 2

INVENTOR.
NATHAN M. HAYNES

BY S. Stephen Baker

ATTORNEY

UNITED STATES PATENT OFFICE 2,628,287

MAGNETIC RECORDING APPARATUS

Nathan M. Haynes, Far Rockaway, N. Y.

Application February 16, 1951, Serial No. 211,270

6 Claims. (Cl. 179—100.2)

This invention relates to magnetic recording apparatus and more particularly to a means for satisfactorily recording and reproducing an extended range of audio frequencies such as may be found in musical works or the like.

Broadly speaking, it is the object of this invention to provide a relatively inexpensive apparatus which can record a full range of audio frequencies (20–20,000 cycles) on a magnetic medium such as magnetic wire or tape. The recording is accomplished with a maximum of fidelity and dynamic range, the frequency range being all or more than is required for conventional purposes, and being far greater than found in currently used, professional recording apparatus of this type.

In relation to the specific means which I employ to accomplish my objectives as hereinafter outlined, the following may be noted. Distortion introduced by magnetic tape, wire, or any magnetic medium in magnetic recording is determined largely by its hysteresis curve or loop as is well understood. In order to plot the hysteresis loop of any such material, a series of static measurements is generally made. This practice, however does not give a complete picture of the magnetic characteristics of the medium. When the magnetic material is placed into a gradually diminishing cyclic state as by the application of an alternating field thereto, a series of successively smaller and smaller hysteresis loops will be formed. If the locus of the cusps of the gradually decreasing hysteresis loops are plotted, the result will be a normal induction curve for that material. It may further be observed that if the normal induction curve is drawn on a graph which indicates the inductive transference characteristics of the material in response to an applied signal, the curve may be designated as a transduction curve just as the corresponding graph of an electron discharge tube is designated as its transconductance curve. Much of the above explanatory matter appears in the book "Elements of Magnetic Tape Recording" by A. C. Shaney, published by the Amplifier Corporation of America, New York, New York (see pages 16, 17, 27–32), A. C. Shaney being my "nom de plume."

Obviously, if the transduction curve is non-linear, distortion of the applied signal will take place. The non-linearity of transduction curves has been generally accepted although certain responses of magnetic materials at particular frequencies should have indicated to a careful observer that the transduction curve of a magnetic material at high audio frequencies is linear. At any rate, the prior art has suggested a different treatment for recording higher frequencies, such treatment involving altering the type of the bias which is applied to the recording medium together with the audio signal. Specifically, such treatment comprised eliminating the supersonic bias for the high frequencies and substituting a D. C. bias therefor while employing two tapes to record the high and low frequency signals respectively. The supersonic bias was retained for the low frequencies. The signal was initially separated into a low and a high band, and these bands were mixed with either the supersonic or the D. C. bias, depending upon whether the band was of high or low frequencies. However, this treatment was not found to be satisfactory and, in any event, has not been widely adopted.

As will hereinafter appear, I have determined that the transduction curve of conventional types of magnetic tape or wire assume varying degrees of linearity at different frequencies. When fully linear, no bias is required and no distortion will be present. This is what occurs at certain higher frequencies. At a particular range of intermediate frequencies, the linearity varies constantly throughout such range, while at low frequencies, the linearity is notably poor and a high supersonic bias is necessary.

In most, if not all, current makes of recorders, a compromise value of supersonic bias is mixed with all signals and thus applied to the recording head. However, since it has been recognized that such bias inherently caused intermodulation distortion or erasure of the higher frequencies, a compromise value is selected where such bias produces minimum erasure for the high frequencies and tolerable distortion for the low frequencies.

Bearing the foregoing in mind, I have devised an apparatus where various frequency ranges are accorded different bias treatment to the end that no appreciable distortion or erasure results at any frequency. No single compromise value of bias is applied. On the contrary, the apparatus provides an optimum supersonic bias for the low frequencies, unaltered by any other considerations such as the requirements of other frequencies, while an intermediate frequency range is provided with a varying supersonic bias, and a high frequency range is provided with no bias at all. Accordingly, a completely extended audio spectrum is covered, with excellent fidelity and with an apparatus that is a little more complex than the inexpensive forms of recorders while considerably less so than expensive recorders which even then do not offer as good results.

The invention will be further understood from the following description and drawings in which.

Figures 1, 2, 3:
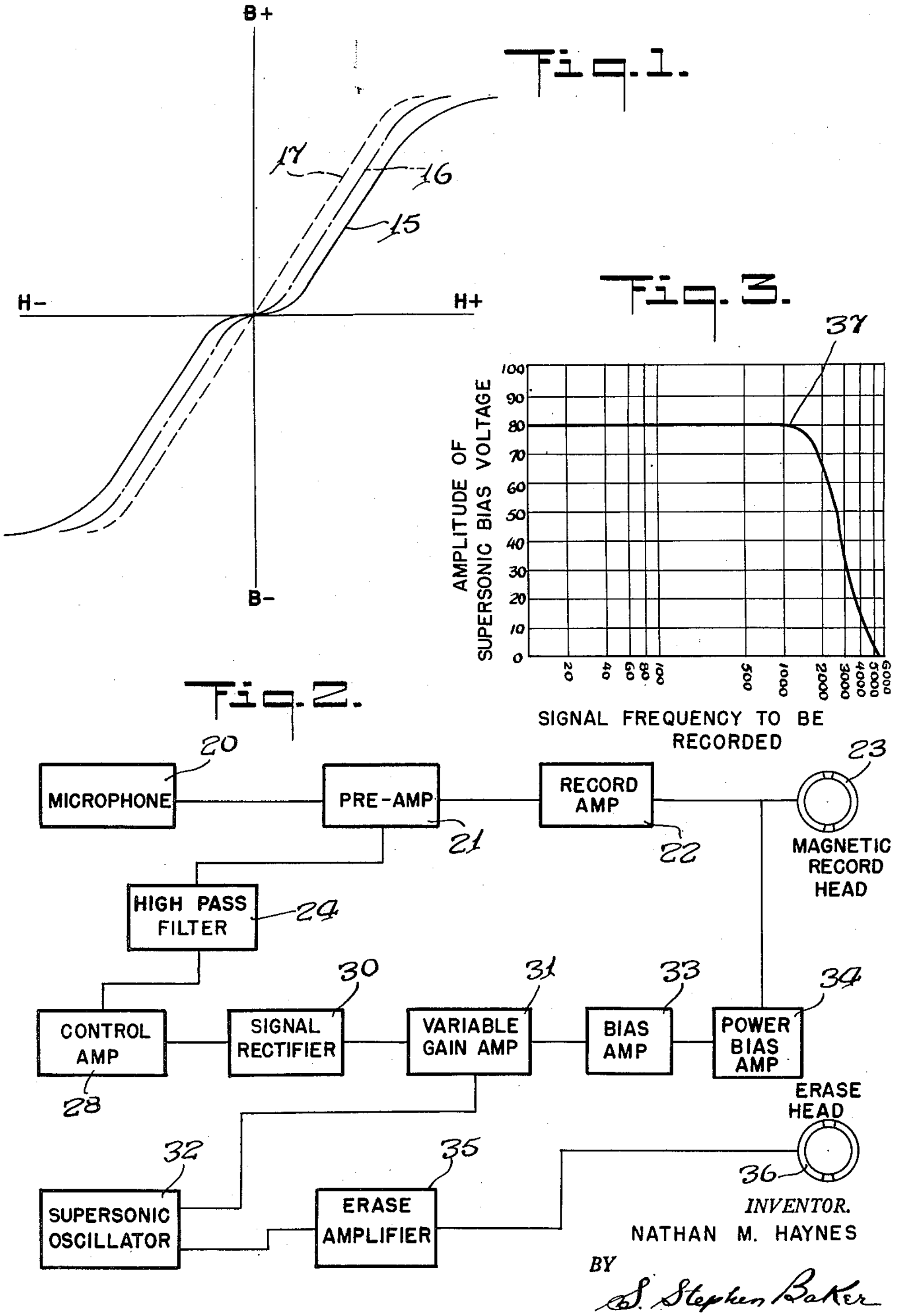
Fig. 1 illustrates transduction curves of a conventional type of magnetic tape at different frequencies.
Fig. 2 is a block diagram of my improved apparatus.
Fig. 3 is a curve illustrating the variable bias applied to the recording head at different frequencies according to my system.

Referring to Fig. 1, there is illustrated what I have deduced are transduction curves of a conventional form of magnetic tape at critical frequencies. I used the graph of Fig. 3 to arrive at these transduction curves. The horizontal axis in the curve of Fig. 1 represents the value of the magnetizing force per unit length applied, both positive and negative, while the vertical axis represents the amount of flux in the per unit area which is induced in the material. Curve 15, shown in full lines, indicates considerable non-linearity at the intersection of lines H and B. In order to eliminate the distortion effects of such non-linearity, the signal requires a particularly high amplitude supersonic bias so that the envelope of the mixed signals extends beyond the central non-linear portion and operates within the linear regions following the central portion. On the other hand, curve 16, shown in dot-dash lines, embodies much less non-linearity and the supersonic bias may be reduced accordingly in amplitude. The general form of curve 16 is believed to occur between 1,200 and 5,000 cycles, the specific form illustrated being at 4,000 cycles. Curve 15 represents the non-linearity at about 1,800 cycles or less. Curve 17, shown in broken lines, represents 5,000 cycles and above, and it is seen that the curve is completely linear and may be employed at any portion thereof with equally good results. Accordingly, no supersonic bias is necessary at 5,000 cycles or above, and no erasure or intermodulation distortion results.

The three transduction curves above described were selected at specific frequencies. However, in a frequency range between 1,200 and 5,000 cycles, the non-linearity varies in extent, this aspect being explained further in this specification.

Accordingly, the apparatus of my invention regulates the amplitude of the supersonic bias in accordance with the specific frequency of the signal being recorded. Between 20 and 1,200 cycles, the maximum or optimum supersonic bias amplitude is mixed with the signal. This range may be characterized as a low audio frequency range. Between 1,200 and 5,000 cycles, the supersonic bias amplitude varies, being high at the beginning of this intermediate audio range and descending substantially to zero at the end of the intermediate range. From 5,000 to 20,000 cycles or more, which may be characterized as the high audio frequency range, the apparatus employs no bias at all.

Figure 4:
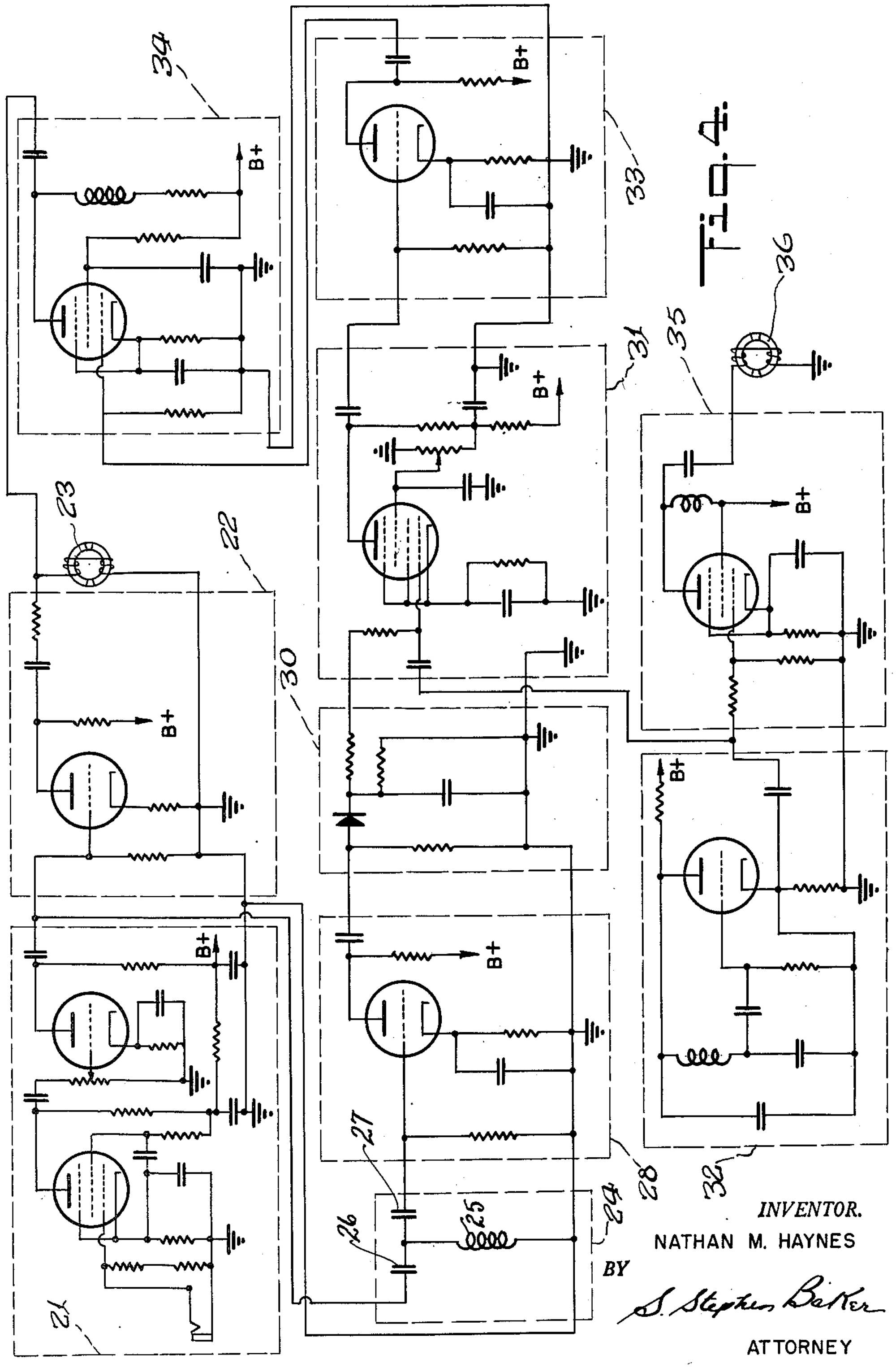
Fig. 4 is a schematic diagram of the apparatus shown in block form in Fig. 2.

Referring now to Figs. 2 and 4 which illustrate a preferred form of the invention, it will be observed that the output of microphone 20 is fed to pre-amplifier 21, to recording amplifier 22, and thence to the recording head 23 in a conventional manner. However, following pre-amplifier 21, the signal is branched off in order to sample the frequency content of the signal to be recorded for the purpose of controlling the supersonic bias amplitude which is also applied to the recording head 23. The signal is first fed through high pass filter 23. As will be noted in Fig. 4, a typical form of such a filter comprises the coil 25 and condensers 26 and 27. In the form shown, the inductive value of the coil 25 was 1.255 henrys while the condensers were each .005 mfd. It will be recognized, of course, that any other form of high pass filter may be used. The response of the filter is essentially a reciprocal of the curve shown in Fig. 3 as will hereinafter be made clear.

The output of the filter 24, which passes only the high frequencies, is applied to control amplifier 28, the output of which is fed to the rectifier 30. Such rectifier produces a varying D. C. voltage which controls the gain in the variable gain amplifier 31. The gain varies only in the intermediate range, there being no gain at high signal frequencies and full gain at low signal frequencies. Variable gain amplifier 31 has a supplementary input from the supersonic oscillator 32 so that the amplitude output of the supersonic bias, as emerging from amplifier 31, is an inverse function of the output of the signal rectifier 30 which is, in turn, a function of the frequency being recorded.

The output of the variable gain amplifier 31 now feeds through a conventional form of bias amplifier 33 and power bias amplifier 34 into the magnetic recording head 33. In addition, the supersonic oscillator 32 may feed a supplementary erase amplifier 35 which, in turn, feeds the erase head 36 as will be understood by those skilled in the art.

No claim is here being made to the individual elements of the system as shown in Fig. 2. Such elements or circuits may be patterned after conventional forms, but in any event, suggested forms thereof are set forth in Fig. 4. Oscillator 32 may supply any normal bias frequency which, as a matter of illustration, may be approximately 30,000 to 100,000 cycles.

Reference is now made to Fig. 3 in which curve 37 illustrates the amplitude of the supersonic bias voltage which is applied in relation to the signal frequency which is to be recorded. This curve discloses that a maximum supersonic bias of 80 volts is applied to the recording head 23 with all frequencies under approximately 1,200 cycles. Between 1,200 and approximately 5,000 cycles, the supersonic bias generally decreases in amplitude until it is eliminated. The particular bias frequency used in this curve was 60 kc. and conventional magnetic tape was employed. It should be noted, however that different tapes require modification of the frequency ranges above stated, but the general principles of dividing the complete range into high and low frequencies and further including intermediate frequencies for particular treatment, is applicable for all tapes.

It will be understood from the foregoing that the value of the supersonic bias is controlled by the signal frequency to be recorded and that such control may follow the curve 37 which is shown in Fig. 3 and which inversely represents the output of the high pass filter. As above set forth, the apparatus enables an extremely wide range of audio frequencies to be recorded with low distortion at all frequencies; minimum erasure; such as formerly occurred at high frequencies, and with high dynamic range of the extended audio range on a single magnetic track.

It will be understood that the invention may take forms other than that illustrated. Thus, by substituting a low pass filter for filter 24, and inverting the rectifier in the signal rectifier 30, the operating process of the system is inverted. In this instance, the variable gain amplifier 31 is biased to complete cut-off so that no supersonic signal is present unless low frequency signals are in the audio signal to be recorded. The only difference between this system and that above described is that there is no quiescent supersonic bias available at the recording head. It is passed through the variable gain amplifier only when low frequency audio signals are present. Either of the above systems may further be employed with a double recording track and in which high frequencies are recorded directly through a high frequency recording head without the use of any bias, while the remaining frequencies are recorded on the other track with the variable bias as above set forth.

It may further be noted that a clipper amplifier may be interposed between control amplifier 28 and signal rectifier 30, such clipper amplifier changing its threshold action within the intermediate frequency range. These changes simply involve raising the amplitude clipping level as the frequency rises in this range. The purpose of employing such a clipper is to make the amount of signal fed to the signal rectifier a function of frequency alone substantially undistorted by amplitude changes.

What is claimed is:

1. A magnetic recording apparatus comprising audio signal input means, a recording head fed by said audio signal input means, a supersonic oscillator the output of which is also fed to said recording head so as to be mixed therein with an audio signal being recorded, means to determine the high or low audio frequency characteristics of said signal being recorded, and means controlled by said determining means to vary the amplitude of the supersonic oscillator output which is applied to said recording head and in accordance with the determination of said frequency characteristics of the signal being recorded.

2. A magnetic recording apparatus comprising audio signal input means, a recording head fed by said input means, a bias member the output of which is also fed to said recording head so as to be mixed therein with an audio signal being recorded, means to determine the high or low audio frequency characteristics of said signal being recorded, and means controlled by said determining means to vary the amplitude of the bias member output which is applied to said recording head, said variation being in accordance with the determination of said frequency characteristics of the signal being recorded.

3. A magnetic recording apparatus comprising audio signal input means, a recording head fed by said audio signal input means, a supersonic oscillator the output of which is also fed to said recording head so as to be mixed therein with an audio signal being recorded, a filter for receiving said audio signal and determining the frequency content thereof, means to produce an output of an amplitude determined by the frequency characteristics of said filter output, and means for controlling the output of said supersonic oscillator in accordance with the output of said filter whereby said oscillator output varies in accordance with the frequency of the signal being recorded and as thus varied is applied to said recording head together with the audio signal being recorded.

4. A magnetic recording apparatus comprising audio signal input means, a recording head fed by said audio signal input means, a supersonic oscillator the output of which is also fed to said recording head so as to be mixed therein with an audio signal being recorded, and control means for feeding a substantially uniform amplitude of oscillator output to said recording head when the audio signal is in a low frequency range characterized as between 20 and 1,200 cycles per second, said control means being further operative to vary downwardly the oscillator output to said recording head when the audio signal is in an intermediate frequency range characterized as from 1,200 to 5,000 cycles and being further operative to cut-off all such oscillator output when the audio signal is in a high range characterized as above 5,000 cycles.

5. A magnetic recording apparatus comprising audio signal input means, a recording head fed by said audio signal input means, a supersonic oscillator the output of which is also fed to said recording head so as to be mixed therein with an audio signal being recorded, a frequency filter for receiving said audio signal and for producing an output therefrom which varies in amplitude in accordance with the frequency characteristics of said audio signal being recorded, a rectifier fed by said filter and producing a variable D. C. output depending upon the amplitude of the filter output, a variable gain amplifier interposed between said supersonic oscillator and said recording head for amplifying the oscillator output which is fed to said recording head, the D. C. output of said rectifier being also applied to said variable gain amplifier so as to vary the gain thereof in accordance with the amplitude of said filter output whereby the amplitude of oscillator output fed to said recording head is controlled by the output of said filter.

6. A magnetic recording apparatus comprising audio signal input means, a recording head fed by said audio signal input means, a supersonic oscillator the output of which is also fed to said recording head so as to be mixed therein with an audio signal being recorded, a high pass filter for receiving said audio signal in parallel with its path to said recording head, said filter being operative to produce an output which is of relatively high, uniform amplitude when the frequency of said audio signal is over 5,000 cycles, said filter being further operative to cut off any output therefrom when the audio signal is below 1,200 cycles and being further operative to produce an upwardly varying amplitude output when the audio signal is between 1,200 and 5,000 cycles, and control means for regulating the amplitude of oscillator output fed to said recording head, said control means being in turn controlled by the output of said filter whereby the amplitude of oscillator output applied to said recording head varies in accordance with the frequency characteristics of said audio signal being recorded.

NATHAN M. HAYNES.

REFERENCES CITED

The following references are of record in the file of this patent:

UNITED STATES PATENTS

| Number | Name | Date |
|---|---|---|
| 2,532,917 | Howell | Dec. 5, 1950 |

FOREIGN PATENTS

| Number | Country | Date |
|---|---|---|
| 218,407 | Switzerland | Dec. 15, 1941 |